Patented Jan. 27, 1942

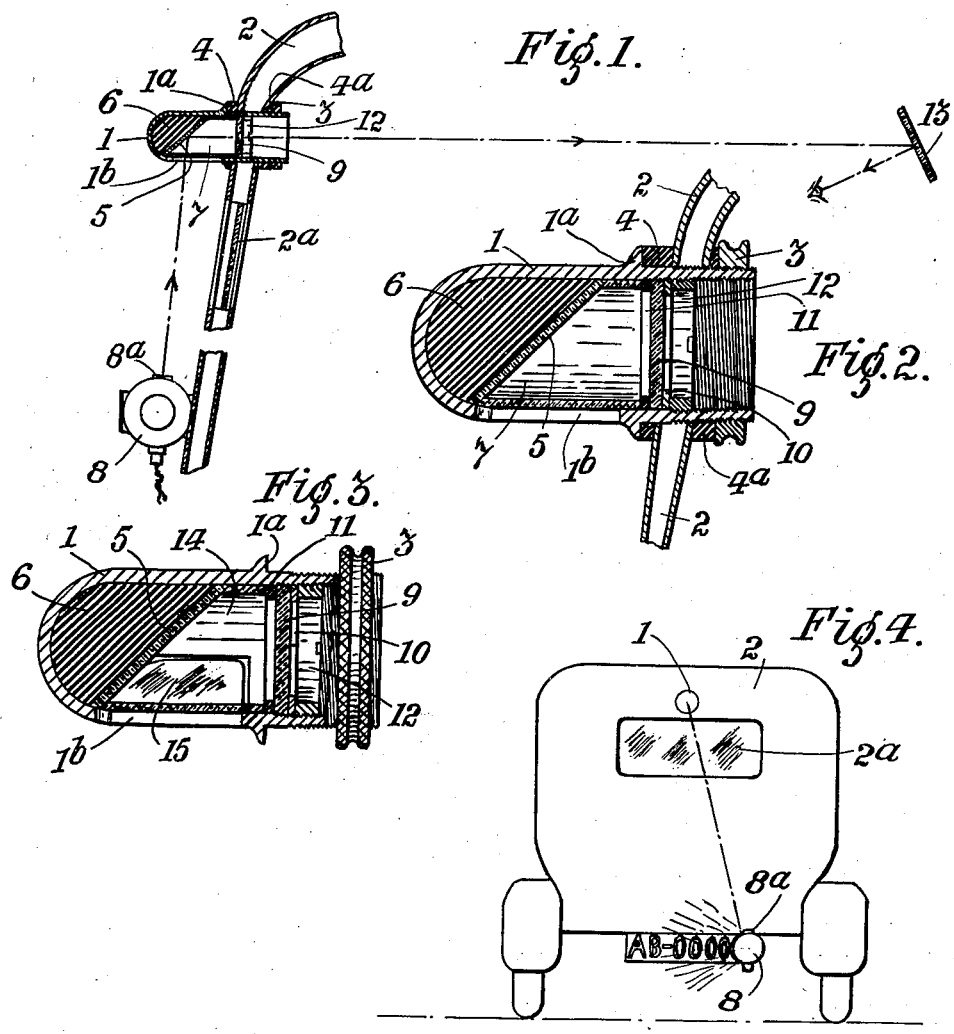

2,271,110

UNITED STATES PATENT OFFICE 2,271,110

REAR LIGHT INDICATOR OR DETECTOR FOR VEHICLES

William John Webster, Belfast, Northern Ireland

Application March 20, 1939, Serial No. 262,821
In Great Britain April 4, 1938

12 Claims. (Cl. 240—8.41)

This invention relates to rear light indicators or detectors for vehicles wherein light from the rear or tail light is transmitted into a position observable by the driver when in the vehicle.

An object of the invention is to provide a simple rear light indicator or detector for vehicles adapted to co-operate with an aperture or the like in the back of the vehicle so as to pass light from the rear lamp to a position observable by the driver when in the vehicle.

A further object is to provide a rear light indicator or detector adapted to co-operate with the usual driving mirror located inside the vehicle in front of the driver.

The invention will now be described merely by way of example, with reference to the accompanying drawing wherein—

Fig. 1 is a diagrammatic view of a rear light indicator or detector for vehicles in accordance with the invention.

Fig. 2 is a longitudinal sectional elevation to a larger scale of the indicator shown in Fig. 1.

Fig. 3 is a longitudinal sectional elevation of a modified form of indicator.

Fig. 4 is a diagrammatic rear elevation of a vehicle showing the indicator in place.

Fig. 5 is a diagrammatic longitudinal sectional elevation of another form of rear light detector or indicator.

Referring to the drawing—

In the example shown in Figs. 1 and 2, the indicator comprises a hollow cylindrical or tubular body member 1 adapted to be passed through the back of the vehicle 2, the member being secured to the back of the vehicle in the middle above the usual rear window 2ᵃ (see Fig. 4) by means of a flange 1ᵃ and locking nut 3, rubber rings or washers 4 and 4ᵃ being interposed between the flange 1ᵃ and locking nut 3 as shown. Mounted in an inclined position in the member 1 is a mirror 5 which is held in the inclined position by means of an obliquely cut rubber member 6 and an obliquely cut glass tubular member 7 to which the mirror is attached. The glass tube 7 together with an aperture 1ᵇ formed in the tubular body member 1, permits light from the rear light 8 of the vehicle to fall on the mirror. Also mounted in the body 1 is a coloured glass window 9 which may be green or any other desired colour. An opaque member 10 (Fig. 2) is also mounted in the body 1 as shown, the member 10 having an opening therethrough in the shape of a star or any other desired distinctive shape. A rubber ring or washer 11 is interposed between the glass tubular member 7 and the window 9 and all of the members in the body 1, are held in place by means of a circular screw-threaded nut 12, the surface of the mirror being more or less hermetically sealed in the glass tube 7 so that the surface thereof will remain clean. The rear light 8 of the vehicle is provided with the usual window 8ᵃ which may be enlarged or otherwise adapted to enable light to pass therefrom to the mirror 5 of the indicator. The device is so mounted, in the back 2 of the vehicle, that it can be observed, by the driver of the vehicle, in the usual driving mirror 13 of the vehicle (see Fig. 1).

The arrangement described is such that, when the rear light 8 is functioning properly, light therefrom passes to the mirror 5 in the indicator and is reflected thereby through the back of the vehicle to the driving mirror 13 or other mirror as may be necessary where it can be observed by the driver of the vehicle. The driver will know that the rear light is functioning so long as he can see the coloured star, or otherwise shaped light, from the indicator, in the driving mirror or otherwise.

The indicator shown in Fig. 3 is similar to that shown in Fig. 2 except that the glass tubular member 7 is replaced by an obliquely cut member 14 of opaque material, a separate window 15 of transparent material such, for example, as mica, Celluloid or the like being attached to the member 14. As shown this window is curved but it may be flat.

In the arrangement shown in Fig. 5 which is specially intended for closed vans, the rear lamp 8 is mounted in the back of the vehicle at the side of the number plate, an opening 8ᵇ being provided through the back of the lamp 8. The lamp is secured to the back of the vehicle by means of a hollow screw-threaded spigot 8ᶜ and locking nut 18. Located in the hollow spigot 8ᶜ is a coloured glass window 9 and pierced opaque member 10 which are held in position by means of a locking nut 12, the member 10 being star-shaped or otherwise characteristically shaped as above described. This arrangement is such that light from the lamp 8 passes through the opening 8ᵇ in the back of the lamp and is observable in a mirror 13 located as shown in Fig. 5.

It will be understood from the above that the invention provides simple arrangements whereby the driver can tell without leaving the driving position whether his rear light is functioning and thus inconvenience and danger are avoided.

It will be understood that the above described embodiments have been given by way of example only and that modifications may be made without departing from the scope of the invention. For example, the inner window of the tubular member may be frosted or may be provided with facets in the same manner as a bicycle reflector or otherwise adapted to give the desired effect when the light from the rear lamp is falling on it. It will also be understood that it may not be necessary to provide the tail lamp with a special window for emitting light to the detector. For example, the detector may be so located with reference to the tail lamp that some of the light emitted for the purpose of illuminating the number plate falls upon the detector as shown in Fig. 4. The edges of the aperture in the back of the car and the tubular member passing through same may be provided with interengaging means such, for example, as a feather and slot to prevent the tubular member turning in the aperture and throwing the mirror out of alignment or focus.

What I claim is:

1. A rear light indicating system for a closed automobile comprising in combination a rear lamp with a light-emitting aperture, a short tubular member located in the back of the car and in alignment with aperture means therein and projecting outwardly from the back of the car, a light receiving aperture in said member and located in the longitudinal wall thereof so as to face said light emitting aperture and receive light rays therefrom only, a reflector wholly enclosed in and protected by the outer end of said member and adapted to pick up the light rays coming through said light receiving aperture and pass same through the tubular member into the automobile, and mirror means in front of the driver in which said light is observable, said lamp being separate from the indicating system and spaced therefrom.

2. A rear light indicating system as claimed in claim 1, in which light filter means is located in the light path between the rear lamp and the mirror to give the light a characteristic colour.

3. A rear light indicating system as claimed in claim 1, in which a coloured transparent element is located in said tubular element to give the light a characteristic colour.

4. A rear light indicating system as claimed in claim 1, comprising an opaque light-shaping member having a star-shaped light-passing part therein to give the light a star shape.

5. A rear light detector adapted to be located in an aperture high up in the rear of an automobile having a rear lamp, comprising a relatively short tubular member having a window on the outer part to receive light from the rear lamp, an inner transparent tubular member having an oblique outer end, a mirror attached to said end for passing the light to the inner end, a transparent closure member at the inner end of the inner tubular member which is thereby hermetically sealed to protect the mirror surface, and means for securing said tubular member in the aperture.

6. A rear light detector as claimed in claim 5, wherein said closure member is coloured to give the light a characteristic colour.

7. A rear light detector as claimed in claim 5, comprising opaque means adjacent said closure member and having a star-shaped light-passing part to impart that shape to the light beam.

8. A rear light detector adapted to be located in an aperture high up in the rear of an automobile having a rear lamp, comprising a relatively short tubular member having an aperture on the outer part to receive light from the rear lamp, an inner tubular member having a window in alignment with said aperture and an oblique outer end, a mirror attached to said end for passing the light to the inner end, a transparent closure member at the inner end of the inner tubular member which is thereby hermetically sealed to protect the mirror surface, and means for securing said tubular member in the aperture.

9. A rear light indicator as claimed in claim 8, wherein said closure member is coloured to give the light a characteristic colour and comprising opaque means adjacent said closure member and having a star-shaped light-passing part to impart that shape to the light beam.

10. A rear light detector adapted to be located at a high elevation in the rear of an automobile having a rear lamp, comprising a relatively short tubular member having an aperture on the outer part to receive light from the rear lamp, an inner tubular member adapted to allow passage of the light rays through the aperture while sealing the same and having an oblique outer end, a mirror attached to said end for passing the light rays to the inner end, a transparent closure member at the rear end of the tubular member which is thereby hermetically sealed to protect the mirror surface, and means for securing said tubular member in the aperture.

11. A rear light detector as claimed in claim 10 wherein the inner tubular member is provided with a window in alinement with said aperture.

12. A rear light detector as claimed in claim 10 wherein the inner tubular member is of transparent material.

WILLIAM JOHN WEBSTER.